United States Patent [19]
McMonigal et al.

[11] Patent Number: 5,196,485
[45] Date of Patent: Mar. 23, 1993

[54] ONE PACKAGE STABLE ETCH RESISTANT COATING

[75] Inventors: Susan U. McMonigal, Allison Park; Debra L. Singer, Pittsburgh; Dennis A. Simpson, Wexford; Joseph A. Klanica, Sarver; Michael A. Mayo, Pittsburgh, all of Pa.

[73] Assignee: PPG Industries, Inc., Pittsburgh, Pa.

[21] Appl. No.: 692,885

[22] Filed: Apr. 29, 1991

[51] Int. Cl.$^5$ .................. C08F 20/32; B05D 7/14
[52] U.S. Cl. .................. 525/327.3; 427/407.1; 427/410; 428/413; 428/416; 525/438; 528/297
[58] Field of Search .................. 525/327.3, 438; 528/297; 428/413; 427/410

[56] References Cited

U.S. PATENT DOCUMENTS

| | | | |
|---|---|---|---|
| 4,102,942 | 7/1978 | Smith et al. | 528/365 |
| 4,147,679 | 4/1979 | Scriven et al. | 523/404 |
| 4,403,003 | 9/1983 | Backhouse | 427/407.1 |
| 4,650,718 | 3/1987 | Simpson | 428/413 |
| 4,681,811 | 7/1987 | Simpson et al. | 428/413 |
| 4,703,101 | 10/1987 | Singer et al. | 528/87 |
| 4,764,430 | 8/1988 | Blackburn et al. | 428/413 |

Primary Examiner—Joseph L. Schofer
Assistant Examiner—Fred Zitomer
Attorney, Agent, or Firm—William J. Uhl

[57] ABSTRACT

A stable one package etch-resistant film-forming composition is disclosed. The composition includes a polyepoxide component having an epoxy equivalent weight on resin solids of less than about 600. The composition further includes a polyacid curing agent having an average acid functionality of greater than 2. The composition is substantially free of basic esterification catalyst, has a cured softening point of greater than about 20° C., and is stable for use as a single-component composition. Also disclosed is a process for applying a color-plus-clear composite coating to a substrate which includes applying a acid-catalyzed thermosetting film-forming composition to a substrate to form a basecoat. The process also comprises applying a stable etch-resistant film-forming composition to the basecoat which includes a polyepoxide and a polyacid curing agent as described above, wherein the topcoat is substantially free of basic esterification catalyst, has a cured softening point of greater than about 20° C. The composition and process are useful in original equipment finishing of automobile and trucks.

19 Claims, No Drawings

ONE PACKAGE STABLE ETCH RESISTANT COATING

FIELD OF THE INVENTION

The present invention concerns an epoxy-based film-forming composition. In particular, it concerns a stable and etch-resistant film-forming composition which is particularly useful in color-plus-clear coating systems.

BACKGROUND OF THE INVENTION

Color-plus-clear coating systems involving the application of the colored or pigmented basecoat to a substrate followed by the application of a transparent or clear topcoat to the basecoat are becoming increasingly popular as original finishes for automobiles. The color-plus-clear systems have outstanding gloss and distinctness of image, and the clear topcoat is particularly important for these properties.

Two-component clearcoat compositions comprising polyisocyanate curing agents and polyols as polyester polyols, polyurethane polyols and acrylic polyols give outstanding gloss and distinctness of image. However, the polyisocyanates are difficult to handle because they are sensitive to moisture and require cumbersome safety precautions because of their toxicity. U.S. Pat. Nos. 4,650,718, 4,681,811, 4,703,101, and 4,764,430 disclose color-plus-clear coatings employing polyepoxides and polyacid curing agents which overcome many problems of polyisocyanate curing agents, but which are still useful as original finishes for automobiles.

A recognized limitation for commercial polyepoxide-based coatings is that commercial embodiments of such coatings are typically two-component systems. Because the polyepoxides and polyacids are typically highly reactive to provide a thorough cure, these components cannot be mixed for a long period of time prior to application. Otherwise, unacceptable increases in viscosity are encountered. Two-component systems require two reservoirs for the different components, as well as separate feed lines and mixing apparatus.

Single-component aminoplast-cured polyol coatings are well-known and provide many excellent properties. However, it is widely recognized that such coatings have poor resistance to etching by acid. Because many geographic areas encounter acid precipitation, these coatings are not highly effective for providing protection for acid resin.

The present invention provides a film-forming composition, which is particularly useful in color-plus-clear coating systems, which has improved stability and improved etch resistance properties. The composition has outstanding gloss and distinctness of image so that the coating is useful as an original finish for automobiles.

SUMMARY OF THE INVENTION

The present invention is directed toward a one package stable etch-resistant film-forming composition which includes a polyepoxide having an epoxy equivalent weight on resin solids of less than about 600 and a polyacid curing agent having an average acid functionality of greater than 2. The composition is further characterized in that it is substantially free of basic esterification catalyst and it has a cured softening point of greater than about 20° C.

The present invention further includes a process for applying a composite coating to a substrate which includes applying an acid-catalyzed thermosetting film-forming composition to a substrate to form a basecoat followed by applying a stable etch-resistant film-forming composition to the basecoat. The topcoat includes a polyepoxide having an epoxy equivalent weight on resin solids of less than about 600 and a polyacid curing agent having an average acid functionality of greater than 2. The topcoat is further characterized in that it is substantially free of basic esterification catalyst and it has a cured softening point of greater than about 20° C.

DETAILED DESCRIPTION OF THE INVENTION

The present invention is a one package stable etch-resistant film-forming composition. The composition includes a high functionality polyepoxide and a polyacid curing agent having high acid functionality. The composition is further characterized in that it is substantially free of basic esterification catalyst, it has a cured softening point of above about 20° C. and it is stable for use as a single-component coating composition. This composition is particularly useful as a clear topcoat in a color-plus-clear system. Further, the present composition provides excellent etch resistance in terms of acid etching and water spotting. In addition, the present composition is particularly useful in conjunction with a high solids acid-catalyzed basecoat because the lack of basic esterification catalyst in the topcoat allows for the use of a strong acid catalyst in the basecoat without cure inhibition. Since a strong acid catalyst can be used in the basecoat, it is possible to use a high solids basecoat and still get acceptable cure.

The polyepoxide of the present composition has a high epoxy functionality (corresponds to low epoxide equivalent weight). This aspect of the polyepoxide component of the present invention is important to obtain good cure and acceptable etch resistance. More specifically, the polyepoxide of the present invention has an epoxide equivalent weight on resin solids of less than about 600, more preferably less than about 400, and most preferably less than about 300.

The polyepoxide of the present invention also preferably has a relatively low molecular weight. This aspect of the polyepoxide component of the present invention is useful in achieving acceptable stability and high solids content. More specifically, the polyepoxide of the present invention has a weight average molecular weight of less than about 20,000, more preferably less than about 10,000, and most preferably less than about 5,000.

The polyepoxide of the present invention is further characterized as providing the film-forming composition with a high cured softening point. The term "cured softening point" refers to the softening point of a cured material of about 1 to 2 mils in thickness as measured by the following procedure. The material in which the cured softening point is to be measured is applied in two coats with a ninety second 75° F. flash between coats to a steel substrate coated with corrosion resistant primer and basecoat as described below in the Examples or other similarly treated substrate. The coating is allowed to air flash at 75° F. for fifteen minutes before baking at 275° F. for 30 minutes to cure. The coated substrate is heated with a thermal mechanical analyzer, such as a Perkin-Elmer TMS-2, from −25° C. to 150° C. at a heating rate of 10° C./min. A penetration probe having a hemispherical tip with a diameter of about 0.089 cm. and a net load of 5 grams is applied. A cured softening point temperature is the mean value of at least three separately determined temperatures at which there is a deflection from the baseline in a plot of indentation versus temperature. The cured softening point of the film-forming composition is at least above about 20° C., more preferably above about 50° C. and most preferably above about 60° C.

The polyepoxide of the present invention is further characterized as having a high calculated glass transition temperature (Tg). Tg can be calculated as described by Fox in Bull. Amer. Physic. Soc., 1, 3, page 123 (1956). The calculated Tg of the polyepoxide is sufficiently high such that, in conjunction with other components of the composition, a cured softening point of the film-forming composition as described above is achieved. It is recognized that softening point temperatures are related to glass transition temperatures and that softening occurs during glass transition. More specifically, the polyepoxide of the present invention typically has a calculated Tg of greater than about 20° C., more preferably greater than about 50° C., and most preferably greater than about 60° C. It should be noted that of the various specific epoxy-functional acrylic resins prepared as discussed below, epoxy-functional acrylic resins prepared using methacrylates, styrenes and mixtures thereof have particularly high Tg values.

Among the polyepoxides which can be used are epoxy-containing acrylic polymers, epoxy condensation polymers such as polyglycidyl ethers of alcohols and phenols, polyglycidyl esters of polycarboxylic acids, certain polyepoxide monomers and oligomers and mixtures of the foregoing.

The epoxy-containing acrylic polymer is a copolymer of an ethylenically unsaturated monomer having at least one epoxy group and at least one polymerizable ethylenically unsaturated monomer which is free of epoxy groups.

Examples of ethylenically unsaturated monomers containing epoxy groups are those containing 1,2-epoxy groups and include glycidyl acrylate, glycidyl methacrylate and allyl glycidyl ether.

Examples of ethylenically unsaturated monomers which do not contain epoxy groups are alkyl esters of acrylic and methacrylic acid containing from 1 to 20 atoms in the alkyl group. Specific examples of these acrylates and methacrylates include methyl methacrylate, ethyl methacrylate, butyl methacrylate, ethyl acrylate, butyl acrylate and 2-ethylhexyl acrylate. Examples of other copolymerizable ethylenically unsaturated monomers are vinyl aromatic compounds such as styrene and vinyl toluene; nitriles such as acrylonitrile and methacrylonitrile; vinyl and vinylidene halides such as vinyl chloride and vinylidene fluoride and vinyl esters such as vinyl acetate.

The epoxy group-containing ethylenically unsaturated monomer is preferably used in amounts of from about 20 to 90, more preferably from 30 to 70 percent by weight of the total monomers used in preparing the epoxy-containing acrylic polymer. Of the remaining polymerizable ethylenically unsaturated monomers, preferably from 10 to 80 percent, more preferably from 30 to 70 percent by weight of the total monomers are the alkyl esters of acrylic and methacrylic acid.

The acrylic polymer may be prepared by solution polymerization techniques in the presence of suitable catalysts such as organic peroxides, such as t-butyl perbenzoate, t-amyl peracetate or ethyl-3,3-di(t-amylperoxy) butyrate or azo compounds, such as benzoyl peroxide, N,N'-azobis (isobutyronitrile) or alpha, alpha-dimethylazobis(isobutyronitrile). The polymerization can be carried out in an organic solution in which the monomers are soluble. Suitable solvents are aromatic solvents such as xylene and toluene, ketones such as methyl amyl ketone or ester solvents such as ethyl 3-ethoxypropionate. Alternately, the acrylic polymer may be prepared by aqueous emulsion or dispersion polymerization techniques.

The epoxy condensation polymers which are used are polyepoxides, that is, those having a 1,2-epoxy equivalency greater than 1, preferably greater than 1 and up to about 5.0. A useful example of such epoxides are polyglycidyl esters from the reaction of polycarboxylic acids with epihalohydrin such as epichlorohydrin. The polycarboxylic acid can be formed by any method known in the art and in particular, by the reaction of aliphatic alcohols with an anhydride, and in particular, diols and higher functionality alcohols. For example, trimethylol propane or pentaerythritol can be reacted with hexahydrophthalic anhydride to produce a polycarboxylic acid which is then reacted with epichlorohydrin to produce a polyglycidyl ester. Such compounds are particularly useful because they are low molecular weight. Accordingly, they have low viscosity and therefore, high solids coatings compositions can be prepared with them. Additionally, the polycarboxylic acid can be an acid-functional acrylic polymer.

Further examples of such epoxides are polyglycidyl ethers of polyhydric phenols and of aliphatic alcohols. These polyepoxides can be produced by etherification of the polyhydric phenol or aliphatic alcohol with an epihalohydrin such as epichlorohydrin in the presence of alkali.

Examples of suitable polyphenols are 2,2-bis(4-hydroxyphenyl) propane (bisphenol A) and 1,1-bis(4-hydroxyphenyl)ethane. Examples of suitable aliphatic alcohols are ethylene glycol, diethylene glycol, pentaerythritol, trimethylol propane, 1,2-propylene glycol and 1,4-butylene glycol. Also, cycloaliphatic polyols such as 1,2-cyclohexanediol, 1,4-cyclohexanediol, 1,4 cyclohexane dimethanol, 1,2-bis(hydroxymethyl) cyclohexane and hydrogenated bisphenol A can also be used.

Besides the epoxy-containing polymers described above, certain polyepoxide monomers and oligomers can also be used. Examples of these materials are described in U.S. Pat. No. 4,102,942 in column 3, lines 1–16. Specific examples of such low molecular weight polyepoxides are 3,4-epoxycyclohexylmethyl 3,4-epoxycyclohexanecarboxylate and bis(3,4-epoxycyclohexylmethyl) adipate. These materials are aliphatic polyepoxides as are the epoxy-containing acrylic polymers. As mentioned above, the epoxy-containing acrylic polymers are preferred because they result in products which have the best combination of coating properties, i.e., smoothness, gloss, durability and solvent resistance. Such polymers have been found to be particularly good in the formulation of clear coats for color-plus-clear applications.

The polyepoxide is present in the film-forming composition in amounts of about 10 percent by weight to 90 percent by weight, preferably from 20 percent by weight to 80 percent by weight and more preferably from 40 percent by weight to 70 percent by weight based on total weight of resin solids.

The composition of the present invention further includes a polyacid component having a high average acid functionality. More specifically, the polyacid curing agent of the present invention on average contains greater than two acid groups per molecule, more preferably three or more and most preferably, four or more, such acid groups being reactive with the polyepoxide to form a crosslinked coating as indicated by its resistance to organic solvent. The parameter of greater than two acid groups per molecule is intended to encompass mixtures of polyacid curing agents in which di-functional curing agents are mixed with tri- or higher functionality polyacid curing agents. Polyacid curing agent mixtures including up to about 50 percent of a di-functional curing agent with a tri-functional curing agent are suitable. Higher percentages of di-functional material can be useful with the remainder of the curing agent mixtures being higher than tri-functional or if the polyepoxide component is highly functional. The acid functionality is preferably carboxylic acid, although acids such as phosphorus-based acid may be used. Preferably, the polyacid curing agent is a carboxylic acid terminated material having, an average, greater than two carboxylic acid groups per molecule. Among the polyacid curing agents which may be used include carboxylic acid group-containing polymers such as acrylic polymers, polyesters, and polyurethanes; oligomers such as ester group-containing oligomers and monomers.

The preferred polyacid curing agents are ester group-containing oligomers. Examples include half-esters formed from reacting polyols and 1,2-acid anhydrides or acid functional polyesters derived from polyols and polyacids or anhydrides. The half-esters are preferred because they are of relatively low molecular weight and are quite reactive with epoxy functionality enabling the formulation of high solids fluid compositions while maintaining outstanding properties such as gloss and distinctness of image.

The half-ester is obtained by reaction between a polyol and a 1,2-acid anhydride under conditions sufficient to ring open the anhydride forming the half-ester with substantially no polyesterification occurring. Such reaction products are of relatively low molecular weight with narrow molecular weight distributions and low viscosity and provide lower volatile organic contents in the coating composition while still providing for excellent properties in the resultant coating. By substantially no polyesterification occurring means that the carboxyl groups formed by the reaction of the anhydride are not further esterified by the polyol in a recurring manner. By this is meant that less than 10, preferably less than 5 percent by weight high molecular weight polyester is formed.

Two reactions may occur in combining the anhydride and the polyol together under suitable reaction conditions. The desired reaction mode involves ring opening the anhydride ring with hydroxyl, i.e.,

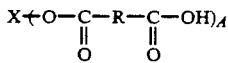

where X is the residue of the polyol after the polyol has been reacted with a 1,2-dicarboxylic acid anhydride, R is an organic moiety associated with the anhydride and A is equal to at least 2.

Subsequently, carboxylic acid groups formed by opening of the anhydride ring may react with hydroxyl groups to give off water via a condensation reaction. This latter reaction is not desired since it can lead to a polycondensation reaction resulting in products with higher molecular weights.

To achieve the desired reaction, the 1,2-acid anhydride and polyol are contacted together usually by mixing the two ingredients together in a reaction vessel. Preferably, reaction is conducted in the presence of an inert atmosphere such as nitrogen and in the presence of a solvent to dissolve the solid ingredients and/or to lower the viscosity of the reaction mixture. Examples of suitable solvents are high boiling materials and include, for example, ketones such as methyl amyl ketone, diisobutyl ketone, methyl isobutyl ketone; aromatic hydrocarbons such as toluene and xylene; as well as other organic solvents such as dimethyl formamide and N-methyl-pyrrolidone.

For the desired ring opening reaction and half-ester formation, a 1,2-dicarboxylic anhydride is used. Reaction of a polyol with a carboxylic acid instead of an anhydride would require esterification by condensation elimination water which would have to be removed by distillation. Under these conditions this would promote undesired polyesterification. Also, the reaction temperature is preferably low, that is, no greater than 135° C., preferably less than 120° C., and usually within the range of 70°-135° C., preferably 90°-120° C. Temperatures greater than 135° C. are undesirable because they promote polyesterification, whereas temperatures less than 70° C. are undesirable because of sluggish reaction.

The time of reaction can vary somewhat depending principally upon the temperature of reaction. Usually the reaction time will be from as low as 10 minutes to as high as 24 hours.

The equivalent ratio of anhydride to hydroxyl on the polyol is preferably at least about 0.8:1 (the anhydride being considered monofunctional) to obtain maximum conversion to the desired half-ester. Ratios less than 0.8:1 can be used but such ratios result in increased formation of lower functionality half-esters.

Among the anhydrides which can be used in formation of the desired polyesters are those which, exclusive of the carbon atoms and the anhydride moiety, contain from about 2 to 30 carbon atoms. Examples include aliphatic, including cycloaliphatic, olefinic and cycloolefinic anhydrides and aromatic anhydrides. Substituted aliphatic aromatic anhydrides are also included within the definition of aliphatic and aromatic provided the substituents do not adversely affect the reactivity of the anhydride or the properties of the resultant polyester. Examples of substituents would be chloro, alkyl and alkoxy. Examples of anhydrides include succinic anhydride, methylsuccinic anhydride, dodecenyl succinic anhydride, octadecenylsuccinic anhydride, phthalic anhydride, tetrahydrophthalic anhydride, methyltetrahydrophthalic anhydride, hexahydrophthalic anhydride, alkyl hexahydrophthalic anhydrides such as methylhexahydrophthalic anhydride, tetrachlorophthalic anhydride, endomethylene tetrahydrophthalic anhydride, chlorendic anhydride, itaconic anhydride, citraconic anhydride and maleic anhydride.

Among the polyols which can be used are simple polyols, that is, those containing from about 2 to 20 carbon atoms, as well as oligomeric polyols and polymeric polyols such as polyester polyols, polyurethane polyols and acrylic polyols.

Among the simple polyols are diols, triols, tetrols and mixtures thereof. Examples of the polyols are preferably those containing from 2 to 10 carbon atoms such as aliphatic polyols. Specific examples include but are not limited to the following compositions: di-trimethylol propane (bis(2,2-dimethylol)dibutylether); pentaerythritol; 1,2,3,4-butanetetrol; sorbitol; trimethylol propane; trimethylol ethane; 1,2,6-hexanetriol; glycerine; trishydroxyethyl isocyanurate; dimethylol propionic acid; 1,2,4-butanetriol; TMP/epsilon-caprolactone triols; ethylene glycol; 1,2-propanediol; 1,3-propanediol; 1,4-butanediol; 1,5-pentanediol; 1,6-hexanediol; neopentyl glycol; diethylene glycol; dipropylene glycol; 1,4-cyclohexanedimethanol and 2,2,4-trimethylpentane-1,3 diol.

With regard to oligomeric polyols, suitable polyols are polyols made from reaction of diacids with triols, such as trimethylol propane/cyclohexane diacid and trimethylol propane/adipic acid.

With regard to polymeric polyols, the polyester polyols are prepared by esterification of an organic polycarboxylic acid or anhydride thereof with organic polyols and/or an epoxide. Usually, the polycarboxylic acids and polyols are aliphatic or aromatic dibasic acids or acid anhydrides and diols.

The polyols which are usually employed in making the polyester include trimethylol propane, di-trimethylol propane, alkylene glycols such as ethylene glycol, neopentyl glycol and other glycols such as hydrogenated bisphenol A, cyclohexanediol, cyclohexanedimethanol, the reaction products of lactones and diols, for example, the reaction product of epsilon-caprolactone and ethylene glycol, hydroxy-alkylated bisphenols, polyester glycols, for example, poly(oxytetramethylene)glycol and the like.

The acid component of the polyester consists primarily of monomeric carboxylic acids or anhydrides having 2 to 18 carbon atoms per molecule. Among the acids which are useful are phthalic acid, isophthalic acid, terephthalic acid, tetrahydrophthalic acid, hexahydrophthalic acid, methylhexahydrophthalic acid, adipic acid, azelaic acid, sebacic acid, maleic acid, glutaric acid, chlorendic acid, tetrachlorophthalic acid and other dicarboxylic acids of varying types. Also, there may be employed higher polycarboxylic acids such as trimellitic acid and tricarballylic acid. However, the use of these higher functionality polycarboxylic acids are not preferred because of resultant high viscosities.

Besides the polyester polyols formed from polybasic acids and polyols, polylactone-type polyesters can also be employed. These products are formed from the reaction of a lactone such as epsilon-caprolactone and a polyol such as ethylene glycol, diethylene glycol and trimethylolpropane.

Besides polyester polyols, polyurethane polyols such as polyester-urethane polyols which are formed from reacting an organic polyisocyanate with a polyester polyol such as those described above can be used. The organic polyisocyanate is reacted with a polyol so that the OH/NCO equivalent ratio is greater than 1:1 so that the resultant product contains free hydroxyl groups. The organic polyisocyanate which is used in preparing the polyurethane polyols can be an aliphatic or aromatic polyisocyanate or a mixture. Diisocyanates are preferred, although higher polyisocyanates such as triisocyanates can be used, but they do result in higher viscosities.

Examples of suitable diisocyanates are 4,4'-diphenylmethane diisocyanate, 1,4-tetramethylene diisocyanate, isophorone diisocyanate and 4,4'-methylenebis(cyclohexyl isocyanate). Examples of suitable higher functionality polyisocyanates are polymethylene polyphenol isocyanates.

It is also possible to use acid-functional acrylic crosslinkers made from copolymerizing methacrylic acid and/or acrylic acid monomers with other ethylenically unsaturated copolymerizable monomers as the polyacid curing agent. Alternatively, acid-functional acrylics can be prepared from hydroxy-functional acrylics reacted with cyclic anhydrides.

The polyacid curing agent is present in the crosslinkable composition in amounts of about 10 to 90, preferably 25 to 75 percent by weight based on total weight of resin solids.

The present film-forming composition is also substantially free of basic esterification catalyst. Although the absence of catalyst has a negative effect on cure of the composition, it is beneficial because it provides for a stable composition and is also beneficial in reducing or eliminating cure inhibition between layers in a color-plus-clear formulation when the base coat contains an acid-catalyzed resinous binder. Also the high functionality associated with the polyepoxide and polyacid provide for sufficient cure response. More specifically, in a preferred embodiment, the composition of the present invention has no or only small amounts of basic esterification catalyst such that the composition is stable for a time sufficient to allow formulation of the composition as a single-component composition. Stability of the present composition is discussed more fully below.

A number of basic esterification catalysts are known in the art. The present invention is substantially free of all such catalysts. Such catalysts include, secondary amine catalysts such as piperidine; tertiary amine catalysts such as N,N-dimethyldodecylamine, pyridine and N,N-dimethylaniline; ammonium compounds, including tetrabutylammonium bromide, tetrabutylammonium hydroxide, and tetrabutylammonium acetate; phosphonium compounds, including ethyltriphenylphosphonium acetate and tetrabutyl-phosphonium bromide; and other ammonium and phosphonium salts.

In addition to the foregoing identified basic esterification catalysts, it is recognized that other common ingredients in coating formulations can have incidental catalytic properties even though the ingredients are added for other purposes. For example, coating compositions frequently include hindered-amine light stabilizers, such as TINUVIN 292. It is recognized that such compositions have small catalytic effect. It is also expressly recognized that compositions of the present invention which are substantially free from basic esterification catalyst can include such compounds provided that the composition otherwise is within parameters of the present invention relating to stability of the composition and absence of cure inhibition. In particular, as shown in a comparison of Examples 2 and 7 below, a standard basic esterification catalyst causes a viscosity increase of over 200 seconds in a #4 Ford cup test after 16 hours at 140° F. as compared with a high of a 12.4 second increase of all compositions which are substantially free of basic esterification catalyst.

The present invention further optionally includes an aminoplast resin for improved resistance to water spotting. As discussed more fully below, the term "etch resistance" refers to a composition's resistance to acid etching and to water spotting. While aminoplast resins improve resistance to water spotting, it is recognized that high levels of aminoplast resins can degrade the acid etch resistant properties of the composition. Typically, when present, the aminoplast resin of the present invention is present in the composition in amounts up to about 30 percent by weight, more preferably up to about 20 percent by weight, and most preferably up to about 15 percent by weight.

Aminoplast resins are condensation products of amines or amides with aldehydes. Examples of suitable amine or amides are melamine, benzoguanamine, urea and similar compounds. Generally, the aldehyde employed is formaldehyde, although products can be made from other aldehydes such as acetaldehyde and furfural. The condensation products contain methylol groups or similar alkylol groups depending on the particular aldehyde employed. Preferably, these methylol groups are etherified by reaction with an alcohol. Various alcohols employed include monohydric alcohols containing from 1 to 4 carbon atoms such as methanol, ethanol, isopropanol and n-butanol, with methanol being preferred. Aminoplast resins are commercially available from American Cyanamid Co. under the trademark CYMEL and from Monsanto Chemical Co. under the trademark RESIMENE. The preferred aminoplast resin is methylated melamine-formaldehyde condensate.

The present composition can also include other optional ingredients, such as plasticizers, anti-oxidants, UV light absorbers and epoxy crosslinkers. A particularly useful class of crosslinkers in the present composition are copolymers of alpha-olefins and olefinically unsaturated anhydrides, such as a 1-octene and maleic anhydride copolymer. In such a crosslinker, the anhydride is preferably opened with ethanol to form an ester and an acid to maintain stability. Examples of these materials and amounts are further described in U.S. Pat. No. 4,927,868.

As discussed above, the present film-forming composition is stable. In particular, it is sufficiently stable to be useful as a single-component system in which the polyepoxide component and the polyacid component are combined substantially prior to application without gelation of the composition and without unacceptable increases in viscosity before use. Once a composition gels, it is no longer possible to use it as a coating composition. If the viscosity of a composition increases to the point of encountering sprayability problems, but the composition is not gelled, additional solvent can be added to reduce viscosity to acceptable levels.

Stability can be measured as an increase in viscosity over time at a given temperature. Various standard tests for measuring viscosity can be used. For example, the Ford cup test is a recognized measure of viscosity. This test measures the amount of time it takes a given volume of a composition to flow out through the orifice of a standard cup.

The stability of a composition for use as a single-component composition can be evaluated by comparison of a Ford cup value of a fresh composition against the same composition after it has been subjected to heat over time. The composition of the present invention is formulated such that with an initial #4 Ford cup viscosity of about 20–30 seconds, after 16 hours at 140° F., the composition has less than about a 25 second gain in #4 Ford cup viscosity, more preferably less than about a 15 second gain, and most preferably less than about a 10 second gain. Alternatively, a composition is considered stable for use as a single-component composition if after about 28 days and more preferably after about 42 days at ambient temperature the composition has less than about a 25 second gain in #4 Ford cup viscosity, more preferably less than about a 15 second gain and most preferably less than about a 10 second gain. Ambient temperature is considered to be less than about 90° F. and more typically at about 70° F. or less.

The composition of the present invention is also suitable for use in formulating high solids compositions. Because the present composition is highly stable, it can be formulated as a high solids composition without the danger of premature gelation. More particularly, the present composition can have a resin solids content of greater than about 40 percent, more preferably greater than about 50 percent and most preferably greater than 55 percent. The resin solids content can be determined by heating 0.3–0.4 grams of the resinous ingredients in the composition in an aluminum weighing dish at 230° F. for 60 minutes.

The composition of the present invention is further characterized in that it has excellent etch resistance properties. As used herein, the term "etch resistance" refers to the ability of a cured composition to resist etching by acids and water spotting. Etch resistance is typically evaluated by visual examination of coated substrates after actual or simulated weathering. It should be noted that simulated weathering, such as that described in Table 4 below, typically, but not always, corresponds to actual weathering. Moreover, it should be noted that cured compositions may have different etch resistance properties when subjected to actual weathering at different geographic sites. An etch resistant composition, as discussed herein, refers to a composition which has etch resistant properties under actual weathering in at least one geographic site or which has etch resistant properties under simulated weathering conditions. The etch resistant properties of the present film-forming composition are attained by a combination of parameters of the composition. It should be recognized that acceptable etch resistance can be achieved by compositions having different specific combinations of such parameters in which certain variables may be outside of specific numerical ranges provided herein. Provided that acceptable etch resistance is attained, such compositions are within the scope of this invention. As identified above, the primary factors affecting etch resistance are high epoxy functionality, high acid functionality, and high Tg characteristics of the film-forming composition.

A further advantage of the present stable etch-resistant composition is its usefulness in combination with a basecoat in a color-plus-clear system. The present composition can be used in conjunction with a wide variety of basecoats and still provide excellent stability and etch resistance. Moreover, the present invention is particularly useful in conjunction with acid-catalyzed basecoats and even more useful for high solids basecoats which are catalyzed by a strong acid catalyst as discussed above. It is recognized that high solids resins composition are highly desirable because of environmental concerns and the need to reduce the volatile organic content of such compositions. However, high solids compositions use low molecular weight reactants and typically require strong catalysts to obtain complete cure and the attainment of good physical and chemical properties. In the case of acid-catalyzed basecoats used in conjunction with epoxy-derived topcoats using basic esterification catalyst, cure inhibition between the two layers can occur. However, in the present invention, the composition is substantially free of basic esterification catalyst and therefore, if used in conjunction with an acid-catalyzed basecoat, no substantial cure inhibition will occur. Moreover, the present composition is particularly useful for use with basecoats which are catalyzed by a strong acid, such as high solids basecoats.

The film-forming composition of the basecoat can be any of the compositions useful in coatings applications, particularly automotive applications. The film-forming composition comprises a resinous binder and a pigment to act as the colorant. Particularly useful resinous binders are the resinous binders described above as well as resinous binders known in the prior art such as acrylic polymers, polyesters, including alkyds, and polyurethanes.

The acrylic polymers are copolymers of one or more alkyl esters of acrylic acid or methacrylic acid optionally together with one or more other polymerizable ethylenically unsaturated monomers. These polymers may be either of the thermoplastic type or thermosetting crosslinking type. Suitable alkyl esters of acrylic acid or methacrylic acid include methyl methacrylate, isobutyl methacrylate, methyl styrene dimer, ethyl methacrylate, butyl methacrylate, ethyl acrylate, butyl acrylate and 2-ethylhexyl acrylate. Suitable other copolymerizable ethylenically unsaturated monomers include vinyl aromatic compounds such as styrene and vinyl toluene; nitriles such as acrylonitrile and methacrylonitrile; vinyl and vinylidene halides such as vinyl chloride and vinylidene fluoride and vinyl esters such as vinyl acetate.

Where the polymer is of the crosslinking type, suitable functional monomers may be used in addition to the other acrylic monomers mentioned above and include, for example, acrylic acid, methacrylic acid, hydroxyethyl acrylate, hydroxyethyl methacrylate, hydroxypropyl acrylate, and hydroxypropyl methacrylate. The coating composition in such cases contains a crosslinking agent such as a condensate of an amine or an amide with formaldehyde such as urea, melamine, or benzoguanamine reacted with formaldehyde or a lower alkyl ether of such condensate in which the alkyl groups contain from 1 to 4 carbon atoms. Other crosslinking agents such as polyisocyanates including blocked polyisocyanates may also be used. Also, the acrylic polymer can be prepared with N-(alkoxymethyl)acrylamides and N-(alkoxyn:ethyl)methacrylamides which result in self-crosslinking acrylic polymers.

The acrylic polymer may be prepared by solution polymerization techniques in the presence of suitable catalysts such as organic peroxides or azo compounds, for example, benzoyl peroxide or N,N'-azobis-(isobutyronitrile). The polymerization can be carried out in an organic solution in which the monomers are soluble. Suitable solvents are aromatic solvents such as xylene and toluene and ketones such as methyl amyl ketone. Alternately, the acrylic polymer may be prepared by aqueous emulsion or dispersion polymerization techniques.

Besides acrylic polymers, the resinous binder for the basecoat composition may be an alkyd resin or a polyester. Such polymers may be prepared in a known manner by condensation of polyhydric alcohols and polycarboxylic acids. Suitable polyhydric alcohols include ethylene glycol, propylene glycol, butylene glycol, 1,6-hexylene glycol, neopentyl glycol, diethylene glycol, glycerol, trimethylolpropane, and pentaerythritol.

Suitable polycarboxylic acids include succinic acid, adipic acid, azelaic acid, sebacic acid, maleic acid, fumaric acid, phthalic acid, tetrahydrophthalic acid, hexahydrophthalic acid, and trimellitic acid. Besides the polycarboxylic acids mentioned above, functional equivalents of the polycarboxylic acids such as anhydrides where they exist or lower alkyl esters of the polycarboxylic acids such as the methyl esters may be used.

Where it is desired to produce air-drying alkyd resins, suitable drying oil fatty acids maybe used and include those derived from linseed oil, soya bean oil, tall oil, dehydrated castor oil or tung oil.

The polyesters and preferably the alkyd resins contain a portion of free hydroxyl and/or carboxyl groups which are available for further crosslinking reaction. Suitable crosslinking agents are the amine or amide-aldehyde condensates or the polyisocyanate curing agents as mentioned above.

Polyurethanes can also be used as the resinous binder of the basecoat. Among the polyurethanes which can be used are polymeric polyols which are prepared by reacting the polyester polyols or acrylic polyols such as those mentioned above with a polyisocyanate such that the OH/NCO equivalent ratio is greater than 1:1 so that free hydroxyl groups are present in the product.

The organic polyisocyanate which is used to prepare the polyurethane polyol can be an aliphatic or an aromatic polyisocyanate or a mixture of the two. Diisocyanates are preferred, although higher polyisocyanates can be used in place of or in combination with diisocyanates.

Examples of suitable aromatic diisocyanates are 4,4'-diphenylmethane diisocyanate and toluene diisocyanate. Examples of suitable aliphatic diisocya1ates are straight chain aliphatic diisocyanates such as 1,6-hexamethylene diisocyanate. Also, cycloaliphatic diisocyanates can be employed. Examples include isophorone diisocyanate and 4,4'-methylene-bis(cyclohexyl isocyanate). Examples of suitable higher polyisocyanates are 1,2,4-benzene triisocyanate and polymethylene polyphenyl isocyanate.

Most of the polymers prepared as described above are organic solvent-based polymers, although acrylic polymers can be prepared via aqueous emulsion polymerization techniques and used as aqueous-based basecoat compositions. Water-based basecoats in color-plus-clear compositions are disclosed in U.S. Pat. No. 4,403,003, and the resinous compositions used in preparing these basecoats can be used in the practice of this invention. Also, water-based polyurethanes such as those prepared in accordance with U.S. Pat. No. 4,147,679 can be used as the resinous binder in the basecoat.

The basecoat composition also contains pigments to give it color. Compositions containing metallic flake pigmentation are useful for the production of so-called "glamour metallic" finishes chiefly upon the surface of automobile bodies. Proper orientation of the metallic pigments results in a lustrous shiny appearance with excellent flop, distinctness of image and high gloss. By flop is meant the visual change in brightness or lightness of the metallic coating with a change in viewing angle, that is, a change from 90° to 180°. The greater the change, that is, from light to dark appearance, the better the flop. Flop is important because it accentuates the lines of a curved surface such as on an automobile body.

Suitable metallic pigments include in particular aluminum flake, copper bronze flake and mica.

Besides the metallic pigments, the basecoat compositions of the present invention may contain non-metallic color pigments conventionally used in the surface coating compositions including inorganic pigments such as titanium dioxide, iron oxide, chromium oxide, lead chromate and carbon black, and organic pigments such as phthalocyanine blue and phthalocyanine green. In general, the pigment is incorporated into the coating composition in amounts of about 1 to 80 percent by weight based on weight of coating solids. The metallic pigment is employed in amounts of about 0.5 to 25 percent by weight of the aforesaid aggregate weight.

If desired, the basecoat composition may additionally contain other materials well known in the art of formulated surface coatings. These would include surfactants, flow control agents, thixotropic agents, fillers, anti-gassing agents, organic co-solvents, catalysts and other customary auxiliaries. These materials can constitute up to 40 percent by weight of the total weight of the coating composition.

The basecoat compositions can be applied to various substrates to which they adhere. The compositions can be applied by conventional means including brushing, dipping, flow coating, spraying and the like, but they are most often applied by spraying. The usual spray techniques and equipment for air spraying and electrostatic spraying and either manual or automatic methods can be used.

Coatings of the present invention can be applied over virtually any substrate including wood, metals, glass, cloth, plastic, foam, including elastomeric substrates, and the like. They are particularly useful in applying over metal and elastomeric substrates that are found on motor vehicles.

During application of the basecoat composition to the substrate, a film of the basecoat is formed on the substrate. Typically, the basecoat thickness will be about 0.05 to 3, preferably 0.1 to 2 mils in thickness.

After application to the substrate of the basecoat composition, a film is formed on the surface of the substrate. This is achieved by driving solvent, i.e., organic solvent or water, out of the basecoat film by heating or simply by an air-drying period. Preferably, the heating step will only be sufficient and for a short period of time to insure that the topcoat composition can be applied to the basecoat without the former dissolving the basecoat composition, i.e., "striking in". Suitable drying conditions will depend on the particular basecoat composition, on the ambient humidity with certain waterbased compositions, but in general a drying time of from about 1 to 5 minutes at a temperature of about 60°-175° F. (20°-79° C.) will be adequate to insure that mixing of the two coats is minimized. At the same time, the basecoat film is adequately wetted by the topcoat composition so that satisfactory intercoat adhesion is obtained. Also, more than one basecoat and multiple topcoats may be applied to develop the optimum appearance. Usually between coats, the previously applied basecoat or topcoat is flashed, that is, exposed to ambient conditions for about 1 to 20 minutes.

After application of the basecoat, the composition of the present invention can be applied to the basecoated substrate by any of the conventional coating techniques such as brushing, spraying, dipping or flowing, but it is preferred that spray applications be used since such applications give the best gloss. Any of the known spray techniques may be employed, such as compressed air spraying, electrostatic spraying and either manual or automatic methods. Prior to application of a topcoat, it is possible to air flash the basecoated substrate for a short amount of time, typically ranging from 1 to 5 minutes. Optionally, the basecoated substrate can be heat flashed between application of a base and topcoat.

After application of the topcoat composition to the basecoat, the coated substrate is heated to cure the coating layers. In the curing operation, solvents are driven off and the film-forming material of the topcoat and/or the basecoat is crosslinked with the acid of any crosslinking agents present. The heating or curing operation is usually carried out at a temperature in the range of from about 250° F. to 400° F., and more preferably in the range of from 260° F. to 325° F. It should be noted that at higher curing temperatures, typically above about 260° F. and more preferably above about 275° F., other parameters of the present invention can be adjusted because of improved crosslinking from the higher curing temperature. For example, lower functionality epoxy-based resins and/or polyacid curing agents may be used. Typically, the thickness of the topcoat is usually from about 0.5 to about 5 mils and more preferably from about 1.2 to about 3 mils.

The invention will be further described by reference to the following examples which are presented for the purpose of illustration only and are not intended to limit the scope of the invention. Unless otherwise indicated, all parts are by weight.

The following examples illustrate the stability of compositions prepared in accordance with the present invention and compare the stability of such compositions with a composition outside the scope of the present invention. The examples further compare the etch resistance properties of compositions in the present invention with other compositions. The examples also demonstrate other properties of compositions within the present invention, such as hardness, gloss and distinctness of image.

EXAMPLE A

An epoxy-containing acrylic was prepared from the following mixture of ingredients:

| Ingredients | Weight in Grams | Percentage by Weight |
|---|---|---|
| Glycidyl methacrylate | 1200.0 | 60.0 |
| Methyl methacrylate | 20.0 | 1.0 |
| Butyl methacrylate | 600.0 | 30.0 |
| Styrene | 140.0 | 7.0 |
| Methyl styrene dimer | 40.0 | 2.0 |
| LUPERSOL 555M60[1] | 200.0 | 6.0 (on monomers) |
| t-Butyl perbenzoate | 10.0 | 0.5 (on monomers) |
| t-Butyl perbenzoate | 10.0 | 0.5 (on monomers) |
| t-Butyl perbenzoate | 10.0 | 0.5 (on monomers) |

[1]t-amyl peracetate (60% in odorless mineral spirits) available from Atochem.

A blend of ethyl 3-ethoxypropionate (597.8 grams) and xylene (184.5 grams) was charged to a suitable reactor and heated to reflux. The glycidyl methacrylate, methyl methacrylate, butyl methacrylate, styrene and methyl styrene dimer were mixed together. The LUPERSOL 555M60, a free radical initiator, and 100 grams of ethyl 3-ethoxypropionate were also mixed together. The premixture of vinyl monomers and the premixture of initiator were added simultaneously to the reaction vessel over a period of about 3 hours while maintaining the reaction at reflux. At the completion of the addition, the reaction mixture was held at reflux for one hour followed by the addition of the first portion of t-butyl perbenzoate, a free radical initiator. The reaction was then held for 30 minutes at reflux. The second portion of t-butyl perbenzoate was added and the reaction held for another 30 minutes at reflux. Then the third portion of t-butyl perbenzoate was added and the reaction was held at reflux for two hours. The reaction mixture was then cooled to room temperature. The reaction mixture had a solids content of about 64 percent solids and a weight average molecular weight of about 2800. The theoretical epoxy equivalent weight based on solids is 237.

EXAMPLE B

An epoxy-containing acrylic was prepared from the following mixture of ingredients:

| Ingredients | Weight in Grams | Percentage by Weight |
|---|---|---|
| Glycidyl methacrylate | 2160.0 | 40.0 |
| Methyl methacrylate | 27.0 | 0.5 |
| Isobutyl methacrylate | 1782.0 | 33.0 |
| Butyl methacrylate | 756.0 | 14.0 |
| Styrene | 648.0 | 12.0 |
| Butyl acrylate | 27.0 | 0.5 |
| VAZO 67[1] | 259.2 | 4.8 (on monomers) |
| t-Butyl perbenzoate | 27.0 | 0.5 (on monomers) |
| t-Butyl perbenzoate | 27.0 | 0.5 (on monomers) |
| t-Butyl perbenzoate | 27.0 | 0.5 (on monomers) |

[1]Alpha, alpha'-dimethylazobis(isobutyronitrile) available from E. I. duPont de Nemours and Company.

A blend of ethyl 3-ethoxypropionate (1886.3 grams) and xylene (686.0 grams) was charged to a suitable reactor and heated to reflux. The glycidyl methacrylate, methyl methacrylate, butyl methacrylate, styrene, isobutyl methacrylate and butyl acrylate were mixed together. The VAZO 67, a free radical initiator, and 777.6 grams of ethyl 3-ethoxypropionate were also mixed together. The premixture of vinyl monomers and the premixture of initiator were added simultaneously to the reaction vessel over a period of about 3 hours while maintaining the reaction at reflux. At the completion of the addition, the reaction mixture was held at reflux for one hour followed by the addition of the first portion of t-butyl perbenzoate. The reaction was then held for 30 minutes at reflux. The second portion of t-butyl perbenzoate was added and the reaction held for another 30 minutes at reflux. Then the third portion of t-butyl perbenzoate was added and the reaction was held at reflux for two hours. The reaction mixture was then cooled to room temperature. The reaction mixture had a solids content of about 59 percent solids and a weight average molecular weight of about 3500. The theoretical epoxy equivalent weight based on solids is 355.

EXAMPLE C

An epoxy-containing acrylic was prepared from the following mixture of ingredients:

| Ingredients | Weight in Grams | Percentage by Weight |
|---|---|---|
| Glycidyl methacrylate | 720.0 | 40.0 |
| Methyl methacrylate | 450.0 | 25.0 |
| Isobutyl methacrylate | 90.0 | 5.0 |
| Butyl methacrylate | 270.0 | 15.0 |

-continued

| Ingredients | Weight in Grams | Percentage by Weight |
|---|---|---|
| Styrene | 90.0 | 5.0 |
| Butyl acrylate | 180.0 | 10.0 |
| VAZO 67 | 27.0 | 1.5 (on monomers) |
| LUPERSOL 533M75[1] | 24.0 | 1.0 (on monomers) |
| LUPERSOL 533M75 | 12.0 | 0.5 (on monomers) |

[1]Ethyl-3,3-di(t-amylperoxy)butyrate (75% in odorless mineral spirits) available from Atochem.

A blend of ethyl 3-ethoxypropionate (667.9 grams) and methyl isobutyl ketone (359.1 grams) was charged to a suitable reactor and heated to reflux. The glycidyl methacrylate, methyl methacrylate, butyl methacrylate, styrene, isobutyl methacrylate and butyl acrylate were mixed together. The VAZO 67 and 80 grams of ethyl 3-ethoxypropionate were also mixed together. The premixture of vinyl monomers and the premixture of initiator were added simultaneously to the reaction vessel over a period of about 3 hours while maintaining the reaction at reflux. At the completion of the addition, the reaction mixture was held at reflux for one hour followed by the addition of the first portion of LUPERSOL 533M75. The reaction was then held for 30 minutes at reflux. The second portion of LUPERSOL 533M75 was added and the reaction held at reflux for two hours. The reaction mixture was then cooled to room temperature. The reaction mixture had a solids content of about 59 percent solids and a weight average molecular weight of about 15400. The theoretical epoxy equivalent weight based on solids is 355.

EXAMPLE D

An epoxy-containing acrylic was prepared from the following mixture of ingredients:

| Ingredients | Weight in Grams | Percentage by Weight |
|---|---|---|
| Glycidyl methacrylate | 2160.0 | 40.0 |
| Methyl methacrylate | 1080.0 | 20.0 |
| Butyl methacrylate | 1080.0 | 20.0 |
| Butyl acrylate | 1080.0 | 20.0 |
| VAZO 67 | 270.0 | 5.0 (on monomers) |
| t-Butyl perbenzoate | 108.0 | 2.0 (on monomers) |
| t-Butyl perbenzoate | 27.0 | 0.5 (on monomers) |

Xylene (Z780.0 grams) was charged to a suitable reactor and heated to reflux. The glycidyl methacrylate, methyl methacrylate, butyl methacrylate and butyl acrylate were mixed together. The VAZO 67, the t-butyl perbenzoate and 900 grams of xylene were also mixed together. The premixture of vinyl monomers and the premixture of initiators were added simultaneously to the reaction vessel over a period of about 3 hours while maintaining the reaction at reflux. At the completion of the addition, the reaction mixture was held at reflux for one hour followed by the addition over 30 minutes of the second portion of t-butyl perbenzoate. The reaction was then held at reflux for two hours. The reaction mixture was then cooled to room temperature. The reaction mixture had a solids content of about 58 percent solids and a weight average molecular weight of about 5000. The theoretical epoxy equivalent weight based on solids is 355.

EXAMPLE E

An epoxy-containing acrylic was prepared from the following mixture of ingredients:

| Ingredients | Weight in Grams | Percentage by Weight |
|---|---|---|
| Glycidyl methacrylate | 805.0 | 35.0 |
| Methyl methacrylate | 46.0 | 2.0 |
| Butyl methacrylate | 1403.0 | 61.0 |
| Styrene | 46.0 | 2.0 |
| LUPERSOL 555M60 | 230.0 | 6.0 (on monomers) |
| t-Butyl perbenzoate | 23.0 | 1.0 (on monomers) |
| t-Butyl perbenzoate | 23.0 | 1.0 (on monomers) |
| t-Butyl perbenzoate | 23.0 | 1.0 (on monomers) |

A blend of ethyl 3-ethoxypropionate (255.3 grams) and xylene (111.3 grams) was charged to a suitable reactor and heated to reflux. The glycidyl methacrylate, methyl methacrylate, butyl methacrylate and styrene were mixed together. The LUPERSOL 555M60 and 115 grams of ethyl 3-ethoxypropionate were also mixed together. The premixture of vinyl monomers and the premixture of initiators were added simultaneously to the reaction vessel over a period of about 3 hours while maintaining the reaction at reflux. At the completion of the addition, the reaction mixture was held at reflux for one hour followed by the addition over about one hour of the first portion of t-butyl perbenzoate. The reaction was then held for 30 minutes at reflux. The second portion of t-butyl perbenzoate was added over about one hour and the reaction held for another 30 minutes at reflux. Then the third portion of t-butyl perbenzoate was added over about one hour and the reaction was held at reflux for two hours. An additional total of about 90 grams of ethyl 3-ethoxypropionate was added to the reaction mixture to adjust it to about 74 percent solids. The reaction mixture was then cooled to room temperature. The reaction mixture had a measured solids content of about 74 percent solids and a weight average molecular weight of about 2800 as determined by gel permeation chromatography using a polystyrene standard. The reaction mixture had an epoxy equivalent weight of about 410 on solids (554 on solution).

EXAMPLE F

A polyacid half-ester of di-trimethylolpropane and methylhexahydrophthalic anhydride was prepared from the following mixture of ingredients:

| Ingredients | Weight in grams |
|---|---|
| Di-Trimethylolpropane | 1584.8 |
| Methylhexahydrophthalic anhydride | 4120.7 |
| Methyl isobutyl ketone | 570.5 |
| n-Propyl alcohol | 2114.4 |

The di-trimethylolpropane and 540.5 grams of methyl isobutyl ketone were charged to a reaction vessel and heated under a nitrogen atmosphere to 115° C. The methylhexahydrophthalic anhydride was added over a period of about 2 hours at 115° C. The remainder of the methyl isobutyl ketone was added as a rinse. The reaction was held at 115° C. for 4 hours. The reaction mixture was then cooled to 100° C., and the n-propyl alcohol was added. The reaction mixture was then heated to 105° C. and held for 2 hours and then cooled to room temperature. The reaction mixture had a solids content of 72.3 percent and an acid value of 163.

EXAMPLE G

A polyacid half-ester of trimethylolpropane and methylhexahydrophthalic anhydride was prepared from the following mixture of ingredients:

| Ingredients | Weight in grams |
|---|---|
| Trimethylolpropane | 588.1 |
| Methylhexahydrophthalic anhydride | 2208.5 |
| Methyl isobutyl ketone | 1198.4 |
| Ethyl alcohol | 279.2 |

The trimethylolpropane and 1065.4 grams of methyl isobutyl ketone were charged to a reaction vessel and heated under a nitrogen atmosphere to 115° C. The methylhexahydrophthalic anhydride was added over a period of about 2 hours at 115° C. The remainder of the methyl isobutyl ketone was added as a rinse. The reaction was held at 115° C. for 4 hours. The reaction mixture was then cooled to 100° C., and the ethyl alcohol was added. The reaction mixture was then heated to 105° C. and held for 2 hours and then stripped to a reaction temperature of 125° C. to remove the ethyl alcohol. A total of 495 grams of solvent was removed. The reaction mixture was cooled to room temperature and 215 grams of methyl isobutyl ketone was added to the reaction mixture to adjust solids to about 70 percent. The reaction mixture had a solids content of 69.9 percent and an acid value of 190.

EXAMPLE H

A polyacid half-ester of neopentyl glycol and methylhexahydrophthalic anhydride was prepared from the following mixture of ingredients:

| Ingredients | Weight in grams |
|---|---|
| Neopentyl glycol | 1300.0 |
| Methylhexahydrophthalic anhydride | 4116.0 |
| Methyl isobutyl ketone | 2321.1 |
| Ethyl alcohol | 541.6 |

The neopentyl glycol and 2121.1 grams of methyl isobutyl ketone were charged to a reaction vessel and heated under a nitrogen atmosphere to 115° C. The methylhexahydrophthalic anhydride was added over a period of about 2 hours at 115° C. The remainder of the methyl isobutyl ketone was added as a rinse. The reaction was held at 115° C. for 4 hours. The reaction mixture was then cooled to 100° C., and the ethyl alcohol was added. The reaction mixture was then heated to 105° C. and held for 2 hours and then stripped to a reaction temperature of 125° C. to remove the ethyl alcohol. A total of 1054.8 grams of solvent was removed. The reaction mixture was cooled to room temperature and 513 grams of methyl isobutyl ketone was added to the reaction mixture to adjust solids to about 70 percent. The reaction mixture had a solids content of 69.9 percent and an acid value of 188.

EXAMPLE I

A polyacid acrylic polymer having methacrylic acid functionality was prepared from the following ingredients:

| Ingredients | Weight in Grams | Percentage by Weight | |
|---|---|---|---|
| Methacrylic acid | 450.0 | 30.0 | |
| Isobutyl methacrylate | 600.0 | 40.0 | |
| Butyl methacrylate | 450.0 | 30.0 | |
| t-Butyl perbenzoate | 90.0 | 6.0 | (on monomers) |
| t-Butyl perbenzoate | 15.0 | 1.0 | (on monomers) |
| t-Butyl perbenzoate | 7.5 | 0.5 | (on monomers) |

Hexyl acetate (1296.0 grams) was charged to a suitable reactor and heated to reflux. The methacrylic acid, isobutyl methacrylate and butyl methacylate were mixed together. The first portion of t-butyl perbenzoate and 99 grams of hexyl acetate were also mixed together. The premixture of vinyl monomers and the premixture of initiator were added simultaneously to the reaction vessel over a period of about 3 hours while maintaining the reaction at reflux. At the completion of the addition, the reaction mixture was held at reflux for ninety minutes followed by the addition of the second portion of t-butyl perbenzoate. The reaction was then held for 30 minutes at reflux. The third portion of t-butyl perbenzoate was added and the reaction held at reflux for two hours. The reaction mixture was then cooked to room temperature. The reaction mixture had a solids content of about 45.9 percent solids, an acid value of 78.3, and a weight average molecular weight of about 3960 as determined by gel permeation chromatography using a polystyrene standard.

EXAMPLE J

A 1-octene/maleic anhydride/ethanol copolymer was prepared as follows:

To a reaction vessel fitted with a condenser, thermometer, nitrogen sparging inlet and agitator was charged 1821.6 grams (16.23 moles) of 1-octene. As the 1-octene was heated at a reflux temperature of 120° C., a first mixture of 458.9 grams of benzoyl peroxide (available as 78 percent by weight aqueous mixture from Pennwalt Corporation as LUCIDOL 78) and 3781.8 grams of butyl acetate was added over a period of three hours. Beginning a half hour after the start of the first addition, a second mixture of 794.8 grams of (8.1 moles) of maleic anhydride and 1890.9 grams of butyl acetate was added over period of two hours. After completion of the additions, heating at reflux was continued for one hour. Thereafter, solvent was removed by distillation with a total distillate of 5457 grams removed. The resulting product was a 1-octene/maleic anhydride copolymer having a solids content of 75.9 percent, a number average molecular weight of about 1061 and a weight average molecular weight of about 2731.

To a reaction vessel equipped with a condenser, thermometer, nitrogen sparging inlet and agitator was charged 6640 grams (23.2 eq. anhydride) of the 1-octene/maleic anhydride copolymer and 1584 grams of denatured ethanol (95% ethanol, 5% methanol) along with 4 grams of dimethylethanolamine. The reaction mixture was heated to 70° C. and followed to constant acid value. Solvent was distilled off at 80° C. to a Gardner Holdt viscosity of U.

The following numbered examples show the preparation of various clear film-forming compositions prepared with epoxy-containing polymers of Examples A-E and various polyacid curing agents of Examples F-J. The coating compositions were evaluated in various tests in color-plus-clear applications. The results of these tests are shown below in Tables 1–5.

EXAMPLE 1

A clear film-forming composition was prepared by mixing together the following ingredients:

| Ingredients | Resin Solids | Weight in grams |
|---|---|---|
| Tinuvin 328[1] | 3.0 | 3.0 |
| Tinuvin 292[2] | 0.4 | 0.4 |
| Polybutylacrylate[3] | 0.25 | 0.4 |
| Ethyl 3-ethoxypropionate[4] | — | 40.0 |
| Epoxy containing acrylic of Example A | 48.6 | 78.0 |
| Di-TMP/methylhexahydrophthalic anhydride half-ester of Example F | 51.4 | 71.0 |

[1]Substituted benzotriazole UV light stabilizer available from Ciba Geigy Corporation.
[2]Sterically hindered tertiary amine light stabilizer available from Ciba Geigy Corporation.
[3]Polybutylacrylate is a flow control agent having Mw of about 6,7000 and a Mn of about 2,600 made in xylene at 62.5% solids.
[4]EKTAPRO EEP solvent from Eastman Chemicals.

EXAMPLE 2

A clear film-forming composition was prepared from the following mixture of ingredients:

| Ingredients | Resin Solids | Weight in grams |
|---|---|---|
| Tinuvin 328 | 3.0 | 3.0 |
| Tinuvin 292 | 0.4 | 0.4 |
| Polybutylacrylate | 0.25 | 0.4 |
| Ethyl 3-ethoxypropionate | — | 38.0 |
| Epoxy containing acrylic of Example B | 58.9 | 100.5 |
| Di-TMP/methyl-hexahydrophthalic anhydride of Example F | 41.1 | 56.8 |

EXAMPLE 3

A clear film-forming composition was prepared from the following mixture of ingredients:

| Ingredients | Resin Solids | Weight in grams |
|---|---|---|
| Tinuvin 328 | 3.0 | 3.0 |
| Tinuvin 292 | 0.4 | 0.4 |
| Polybutylacrylate | 0.25 | 0.4 |
| Ethyl 3-ethoxypropionate | — | 39.0 |
| Epoxy containing acrylic of Example A | 53.4 | 85.7 |
| Trimethylol propane-methyl hexahydrophthalic anhydride half-ester of Example G | 46.6 | 66.6 |

EXAMPLE 4

A clear film-forming composition was prepared from the following mixture of ingredients:

| Ingredients | Resin Solids | Weight in grams |
|---|---|---|
| Tinuvin 328 | 3.0 | 3.0 |
| Tinuvin 292 | 0.4 | 0.4 |
| Polybutylacrylate | 0.25 | 0.4 |
| Ethyl 3-ethoxypropionate | — | 76.0 |
| Epoxy containing acrylic of Example C | 58.9 | 98.2 |
| Di-TMP/methylhexahydrophthalic anhydride half-ester of | 41.1 | 56.8 |

EXAMPLE 5

A clear film-forming composition was prepared from the following mixture of ingredients:

| Ingredients | Resin Solids | Weight in grams |
| --- | --- | --- |
| Tinuvin 328 | 3.0 | 3.0 |
| Tinuvin 292 | 0.4 | 0.4 |
| Polybutylacrylate | 0.25 | 0.4 |
| Ethyl 3-ethoxypropionate | — | 31.5 |
| Epoxy containing acrylic of Example A | 52.1 | 83.6 |
| Neopentyl glycol-methyl-hexahydrophthalic anhydride half-ester of Example H | 47.9 | 68.4 |

EXAMPLE 6

A clear film-forming composition was prepared from the following mixture of ingredients:

| Ingredients | Resin Solids | Weight in grams |
| --- | --- | --- |
| Tinuvin 328 | 3.0 | 3.0 |
| Tinuvin 292 | 0.4 | 0.4 |
| Polybutylacrylate | 0.25 | 0.4 |
| Ethyl 3-ethoxypropionate | — | 37.7 |
| Epoxy containing acrylic of Example D | 58.9 | 98.2 |
| Di-TMP/methylhexahydrophthalic anhydride half-ester of Example F | 41.1 | 56.8 |

EXAMPLE 7

A clear film-forming composition was prepared from the following mixture of ingredients:

| Ingredients | Resin Solids | Weight in grams |
| --- | --- | --- |
| Tinuvin 328 | 3.0 | 3.0 |
| Tinuvin 292 | 0.4 | 0.4 |
| Polybutylacrylate | 0.25 | 0.4 |
| Ethyl 3-ethoxypropionate | — | 45.2 |
| Epoxy containing acrylic of Example B | 58.9 | 100.5 |
| Di-TMP/methylhexahydrophthalic anhydride half-ester of Example F | 41.1 | 56.8 |
| ARMEEN DM 12D[1] | 2.0 | 2.0 |

[1]N,N-dimethyldodecyl amine catalyst available from AKZO Chemical.

EXAMPLE 8

A clear film-forming composition was prepared from the following mixture of ingredients:

| Ingredients | Resin Solids | Weight in grams |
| --- | --- | --- |
| Tinuvin 328 | 3.0 | 3.0 |
| Tinuvin 292 | 0.4 | 0.4 |
| Polybutylacrylate | 0.25 | 0.4 |
| Ethyl 3-ethoxypropionate | — | 35.0 |
| Epoxy containing acrylic of Example B | 53.0 | 90.4 |
| Di-TMP/methylhexahydrophthalic anhydride half-ester of Example F | 37.0 | 51.1 |
| RESIMENE 741[1] | 10.0 | 11.4 |

[1]Aminoplast resin available from Monsanto.

EXAMPLE 9

A clear film-forming composition was prepared from the following mixture of ingredients:

| Ingredients | Resin Solids | Weight in grams |
| --- | --- | --- |
| Tinuvin 328 | 3.0 | 3.0 |
| Tinuvin 292 | 0.4 | 0.4 |
| Polybutylacrylate | 0.25 | 0.4 |
| Ethyl 3-ethoxypropionate | — | 35.0 |
| Epoxy containing acrylic of Example A | 52.8 | 84.8 |
| Trimethylol propane-methyl-hexahydrophthalic anhydride half-ester of Example G | 23.0 | 32.9 |
| Neopentyl glycol-methylhexahydrophthalic anhydride half-ester of Example H | 24.2 | 34.6 |

EXAMPLE 10

A clear film-forming composition was prepared from the following mixture of ingredients:

| Ingredients | Resin Solids | Weight in grams |
| --- | --- | --- |
| Tinuvin 328 | 3.0 | 3.0 |
| Tinuvin 292 | 0.4 | 0.4 |
| Polybutylacrylate | 0.25 | 0.4 |
| Ethyl 3-ethoxypropionate | — | 45.0 |
| Epoxy containing acrylic of Example A | 23.4 | 37.6 |
| Epoxy condensation polymer[1] | 27.2 | 27.2 |
| Di-Trimethylol propane-methyl-hexahydrophthalic anhydride half-ester of Example F | 49.4 | 68.3 |

[1]Polyglycidyl ester from reaction of epichlorohydrin with the reaction product of trimethylol propane and hexahydrophthalic anhydride.

EXAMPLE 11

A clear film-forming composition was prepared from the following mixture of ingredients:

| Ingredients | Resin Solids | Weight in grams |
| --- | --- | --- |
| Tinuvin 328 | 3.0 | 3.0 |
| Tinuvin 292 | 0.4 | 0.4 |
| Polybutylacrylate | 0.25 | 0.4 |
| Ethyl 3-ethoxypropionate | — | 42.0 |
| Epoxy containing acrylic of Example A | 36.0 | 57.8 |
| Acid containing acrylic of Example I | 45.0 | 90.0 |
| Di-Trimethylol propane-methyl-hexahydrophthalic anhydride half-ester of Example F | 19.0 | 26.3 |

EXAMPLE 12

A clear film-forming composition was prepared from the following mixture of ingredients:

| Ingredients | Resin Solids | Weight in grams |
| --- | --- | --- |
| Tinuvin 328 | 2.7 | 2.7 |
| Tinuvin 292 | 0.35 | 0.35 |
| Polybutylacrylate | 0.25 | 0.4 |
| Poly 2-ethylhexyl acrylate[1] | 0.25 | 0.5 |
| Ethyl 3-ethoxypropionate | — | 37.2 |
| n-propanol | — | 6.0 |
| R-812 silica dispersion[2] | 4.0 | 9.4 |
| Epoxy containing acrylic of Example A | 33.5 | 53.2 |
| Epoxy containing acrylic of Example E | 19.5 | 26.4 |
| Di-Trimethylol propane-methyl-hexahydrophthalic anhydride half-ester of Example F | 34.5 | 48.2 |
| 1-octene/maleic anhydride/ethanol polymer of Example J | 9.3 | 13.0 |

[1]Poly 2-ethylhexyl acrylate is a flow control agent of Mw = 32,936 and Mn = 7934 made in xylene at 50% solids.
[2]R-812 silica from Degussa dispersed in n-amyl alcohol and a TMP/methylhexahydrophthalic anhydride half ester of Example G.

The film-forming compositions of Examples 1 to 12 were applied to a pigmented basecoat to form color-plus-clear composite coatings over electrocoated steel substrates. The pigmented basecoat For Examples 1-11 is commercially available from PPG Industries, Inc. and identified as HUBC-9517 and for Example 12 is commercially available from PPG Industries, Inc. and identified as NHUBC-9517. The basecoats were pigmented black in color. The commercially available HUBC-9517 black basecoat was modified for use by the addition of 1.25% (on resin solids) dodecyl benzene sulfonic acid and by reducing the basecoat to 19 seconds (75° F.) #4 Ford cup viscosity with ethyl 3-ethoxypropionate. The NHUBC-9517 basecoat was reduced to 17.8 seconds #4 Ford cup viscosity using butyl acetate. The electrocoat used on the steel is commercially available from PPG Industries, Inc. and identified as ED-11.

The basecoats were spray applied in two coats to electrocoated steel panels at a temperature of about 75° F. A ninety second flash time was allowed between the two basecoat applications. After applying the second basecoat, a five minute flash time was allowed at 75° F. before the clear coating compositions of Examples 1-12 were applied. The clear coating compositions were all applied in two coats with a ninety second 75° F. flash time allowed between coats. The composite coating was allowed to air flash at 75° F. for fifteen minutes (five minutes for Example 12) before baking at 275° F. for 30 minutes to cure both coatings. The panels were baked in a horizontal position. The properties of the composite coatings are reported in tables 1-5 below.

TABLE 1

| | Viscosity Gains | | |
| --- | --- | --- | --- |
| Example | Original #4 Ford cup viscosity[1] (seconds at 75° F.) | #4 Ford cup viscosity after 16 hours at 140° F. (seconds at 75° F.) | Viscosity gain after 140° F./16 hour test (seconds at 75° F.) |
| 1 | 23.5 | 31.5 | 8.0 |
| 2 | 23.6 | 29.0 | 5.4 |
| 3 | 23.6 | 36.0 | 12.4 |
| 4 | 23.8 | 24.8 | 1.0 |
| 5 | 23.8 | 31.3 | 7.5 |
| 6 | 23.8 | 26.4 | 2.6 |
| 7 | 23.8 | 242.6 | 218.8 |
| 8 | 24.7 | 29.3 | 4.6 |
| 9 | 23.6 | 30.0 | 6.4 |
| 10 | 24.7 | 29.0 | 4.3 |
| 11 | 23.8 | 27.4 | 3.6 |

TABLE 1-continued

| | Viscosity Gains | | |
| --- | --- | --- | --- |
| Example | Original #4 Ford cup viscosity[1] (seconds at 75° F.) | #4 Ford cup viscosity after 16 hours at 140° F. (seconds at 75° F.) | Viscosity gain after 140° F./16 hour test (seconds at 75° F.) |
| 12 | 23.6 | 30.2 | 6.6 |

[1]Ford cup viscosity determined by using #4 Ford cup according to ASTM D 1200-82.

TABLE 2

| | Solids/Gloss/Distinctness of Image | | | | |
| --- | --- | --- | --- | --- | --- |
| Example | % weight solids of clear coat composition | Actual Clear Film Thickness | Actual Basecoat Film Thickness | 20°[1] Gloss | DOI[2] |
| 1 | 52.5% | 1.5 | 0.5 | 86 | 100 |
| 2 | 50.9% | 1.5 | 0.5 | 86 | 100 |
| 3 | 52.7% | 1.5 | 0.5 | 87 | 100 |
| 4 | 42.7% | 1.5 | 0.5 | 79 | 65 |
| 5 | 55.2% | 1.5 | 0.5 | 87 | 100 |
| 6 | 50.6% | 1.5 | 0.5 | 84 | 85 |
| 7 | 51.4% | 1.6 | 0.5 | 86 | 90 |
| 8 | 52.4% | 1.6 | 0.5 | 89 | 100 |
| 9 | 53.2% | 1.7 | 0.6 | 87 | 100 |
| 10 | 55.6% | 1.5 | 0.6 | 88 | 100 |
| 11 | 44.2% | 1.9 | 0.6 | 86 | 85 |
| 12 | 52.4% | 1.7 | 0.6 | 86 | 100 |

[1]20° gloss measured with a 20° gloss meter manufactured by Gardner Instrument Company.
[2]DOI determined by C-Box manufactured by I²R Company.

TABLE 3

| | Hardness | | |
| --- | --- | --- | --- |
| Example | Knoop Hardness[1] using Tukon | Pencil Hardness[2] | Pencil Hardness after 3 minute xylene spot |
| 1 | 12.50 | H | H |
| 2 | 11.05 | H | H |
| 3 | 11.35 | H | H |
| 4 | 11.80 | H | H |
| 5 | 9.65 | H | <6B |
| 6 | 9.55 | H | H |
| 7 | 9.08 | H | H |
| 8 | 10.85 | H | H |
| 9 | 9.45 | H | H |
| 10 | 11.10 | H | H |
| 11 | 9.95 | H | H |
| 12 | 9.00 | H | H |

[1]Knoop hardness measured using Tukon Micro-hardness Tester instrument.
[2]Pencil hardness (Gouge Hardness) determined by ASTM D 3363-74.

TABLE 4

| | Spotting Resistance/Etch Resistance | | |
| --- | --- | --- | --- |
| Example | aqueous $H_2SO_4$ (pH = 2) | City of Cleveland Tap Water | aqueous $H_2SO_4$ (pH = 3) |
| 1 | Good | Excellent | Good |
| 2 | Good | Good | Good |
| 3 | Fair | Fair | Fair |
| 4 | Good | Excellent | Good |
| 5 | Poor | Poor | Poor |
| 6 | Fair | Poor | Fair |
| 7 | Good | Good | Good |
| 8 | Fair | Good | Good |
| 9 | Fair | Fair | Good |
| 10 | Good | Fair | Good |
| 11 | Excellent | Excellent | Excellent |
| DCT-3000[1] | Failure | Good | Poor |

[1]Commercially available aminoplast cured acrylic polyol based clearcoat from PPG Industries, Inc.

Panels were heated to 125 degrees F. for 30 minutes. Ten to fifteen drops of water were placed on the panel and the panel was dried at 125 degrees F. for 30 minutes. The dried panels were washed with soap and water and evaluated.

| Spotting/Etch Rating Scale | |
| --- | --- |
| Excellent = | No spots |
| Good = | Very light spots |
| Fair = | Light spots |
| Poor = | Spots |
| Failure = | Heavy/deep spots |

TABLE 5

| | Cured Softening Point | | |
| --- | --- | --- | --- |
| Example | Measured Softening Point | Mean Softening Point (°C.) | Standard Deviation |
| 1 | 69.2 | 67.3 | 1.68 |
| | 66.4 | | |
| | 66.2 | | |
| 2 | 47.4 | 49.1 | 18.7 |
| | 62.7 | | |
| | 23.3 | | |
| | 63.1 | | |
| 3 | 61.7 | 60.2 | 1.33 |
| | 59.3 | | |
| | 59.5 | | |
| 5 | 53.4 | 50.7 | 3.53 |
| | 46.7 | | |
| | 52.0 | | |
| 6 | 25.1 | 44.8 | 15.1 |
| | 55.3 | | |
| | 57.9 | | |
| | 40.7 | | |

Panels were heated from −25° C. to 150° C. with a Perkin-Elmer TMS-2 thermal mechanical analyzer at a heating rate of 10° C./min. A penetration probe having a hemispherical tip with a diameter of about 0.089 cm. and a net load of 5 grams was applied. The deflection from the base line in a plot of indentation versus temperature is considered the measured softening.

As shown in Table 1, all examples, except for Example 7 had acceptable low viscosity gains after testing, and therefore are considered to be stable for use as a single component composition. All of these examples are substantially free of basic esterification catalyst. Example 7, which gained over 218 seconds in viscosity after 16 hours at 140° F., included a standard polyesterification catalyst.

The results in Table 2 illustrate the percent weight solids of the clear coat compositions of Examples 1–12. In addition, the gloss and depth of image are shown for the various cured coatings.

Table 3 shows the results of Knoop hardness and pencil hardness tests. Examples 1–12 all show good hardness, except for Example 5 in the pencil hardness test after a 3 minute xylene spot. Example 5 contains, as a polyacid curing agent, a neopentyl glycol-methylhexahydrophthalic anhydride half-ester which has an acid functionality of 2.0. In contrast, all remaining examples have polyacid curing agents with acid functionalities of greater than 2. For example, the composition in Example 9 has an acid functionality of about 2.5. It has equal amounts of a tri-functional acid and a di-functional acid.

Table 4 shows the results of water spotting and etch resistance tests. Example DCT-3000 is a single-component melamine-based clearcoating composition. As discussed above, such compositions are known as having poor etch resistance. Example 5 also showed poor etch resistance in all 3 categories tested. As discussed above, Example 5 uses a polyacid curing agent having an acid functionality of 2.0. All remaining examples show demonstrably better etch resistance than Examples 5 and DCT-3000.

Table 5 shows the cured softening points of the clear coating compositions of Examples 1, 2, 3, 5 and 6. All had high cured softening points of greater than 49° C.

The foregoing examples are provided for the purpose of illustration and are not intended to limit the scope of the present invention, as claimed below.

Therefore, What is claimed is:

1. A stable one-package etch-resistant liquid film-forming composition, comprising:
   (a) a polyepoxide having a weight average molecular weight of less than 10,000, an epoxy equivalent weight on resin solids of less than about 600;
   (b) a polyacid curing agent having an average acid functionality of 3 or greater;
   (c) wherein said film-forming composition is substantially free of basic esterification catalyst; and
   (d) wherein said film-forming composition has a cured softening point of 44.8° C. and higher; said composition is stable for at least 16 hours at 140° F. such that the composition has less than a 25 second gain in No. 4 Ford cup viscosity.

2. A composition, as claimed in claim 1, further comprising an aminoplast resin.

3. A composition, as claimed in claim 2, wherein said aminoplast resin is a melamine and formaldehyde condensate.

4. A composition, as claimed in claim 1, further comprising up to 30 percent by weight of an aminoplast resin.

5. A composition, as claimed in claim 1, wherein the polyepoxide is a copolymer of at least one monoethylenically unsaturated monomer having at least one epoxy group and at least one monoethylenically unsaturated monomer which is free of epoxy groups.

6. A composition, as claimed in claim 5, in which the copolymer is a copolymer of glycidyl acrylate or glycidyl methacrylate with at least one other copolymerizable ethylenically unsaturated monomer.

7. A composition, as claimed in claim 6, in which the other copolymerizable ethylenically unsaturated monomer comprises an alkyl ester of acrylic or methacrylic acid containing from 1 to 20 carbon atoms in the alkyl group.

8. A composition, as claimed in claim 1, wherein said polyepoxide is an epoxy functional acrylic polymer prepared from methacrylates, styrenes, and mixtures thereof.

9. A composition, as claimed in claim 1, wherein said polyepoxide is a polyglycidyl ester.

10. A composition, as claimed in claim 9, wherein said polyglycidyl ester is derived from a polycarboxylic acid.

11. A composition, as claimed in claim 10, wherein said polycarboxylic acid is derived from reaction of a polyol with an anhydride and wherein said polyol has an average functionality of greater than two.

12. A composition, as claimed in claim 10, wherein said polycarboxylic acid is an acid-functional acrylic polymer.

13. A composition, as claimed in claim 1, wherein said polyepoxide is selected from the group consisting of epoxy functional acrylic polymers prepared from methacrylates, styrenes, and mixtures thereof; polyglycidyl esters; and mixtures thereof.

14. A composition, as claimed in claim 1, wherein said polyacid curing agent is a carboxylic acid-terminated material having an average of greater than two carboxylic acid groups per molecule.

15. A composition, as claimed in claim 14, wherein said polyacid curing agent is a carboxylic acid-terminated polyester.

16. A composition, as claimed in claim 15, wherein the carboxylic acid-terminated polyester is of the structure:

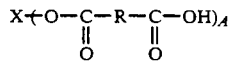

where X is a residue of a polyol after the polyol has been reacted with a 1,2-dicarboxylic acid anhydride, R is an organic moiety associated with the anhydride, and A is equal to at least two.

17. A composition, as claimed in claim 16, wherein said polyol is selected from the group consisting of di-trimethylol propane, pentaerythritol, 1,2,3,4-butanetetrol, sorbitol, trimethylol propane, trimethylol ethane, 1,2,6-hexanetriol, glycerin, trishydroxyethyl isocyanurate, dimethylol propionic acid, 1,2,4-butane triol, and mixtures thereof.

18. A composition, as claimed in claim 1, wherein said composition has a resin solids content of at least about 40 percent.

19. A stable one package etch-resistant film-forming composition, comprising:
(a) a polyepoxide having an epoxy equivalent weight on resin solids of less than about 400, wherein said polyepoxide has a weight average molecular weight of less than about 5000;
(b) a polyacid curing agent having an average acid functionality of at least 4;
(c) wherein said film-forming composition is substantially free of basic esterification catalyst; and
(d) wherein said film-forming composition has a cured softening point of greater than about 50° C., said composition is stable for at least 16 hours at 140° F. such that the composition has less than a 25 second gain in No. 4 Ford cup viscosity.

* * * * *